Patterned Interlayer

Top Protective Layer
Patterned Interlayer
Bottom Strippable Layer

INVENTORS
David D. Seltzer
Gilbert J. Chuhran

United States Patent Office 3,161,038
Patented Dec. 15, 1964

3,161,038
STRIPPABLE PERMANENT THERMO-
GRAPHIC TEST PATTERN
David D. Seltzer, Towson, and Gilbert J. Chuhran, Baltimore, Md., assignors to Martin-Marietta Corporation, Baltimore, Md., a corporation of Maryland
Filed Dec. 21, 1961, Ser. No. 161,012
7 Claims. (Cl. 73—15.4)

This invention relates to a method of testing, or inspecting, a bond between parts of fabricated articles to determine the nature of the bond and to a thermographic pattern forming a permanent record of the test results. More particularly, the invention relates to an inspection method and device for determining the quality of the bond in a honeycomb brazed sandwich formed from low heat conductive materials such as stainless steel, titanium and columbium although the method and device is applicable to an evaluation of the nature of the brazed bond formed with other types of low heat conductive materials such as tantalum, columbium, tungsten, vanadium and the like.

As is known, materials such as those mentioned above, due to their high strength to weight ratio, are increasingly used as structural materials, especially in air and other types of space vehicles. Yet due to the very high cost of such vehicles structural failures should be avoided if at all possible. Also, as is known, there is no universal method or means for conclusively determining the characteristics of the metal-to-metal bonds in such structures in order to make them "fail safe." As a result a number of testing procedures and devices have been developed including, X-raying, ultrasonic inspection by immersion in liquids, infra-red inspection photographically recorded, and thermographic inspection based on a change in the physical appearance of a fusible solid which is thermally fused, or melted, and then re-solidified. Each of the foregoing testing methods have limitations of a practical or technical nature. For example, the use of X-rays requires skill, is dangerous unless handled by trained technicians and does not permit the inspection of materials which must be X-rayed through the facing materials of a sandwich in which the core and brazing material are of an equal or lesser density. Ultrasonic inspection through immersion requires protective covering, recording of results, requires skill and is relatively expensive. Extremely thin facing materials do not lend themselves to ultrasonic inspection due to noise interference. In the thermographic method mentioned above very finite controls must be exercised to avoid excessive melting and the differences in the physical appearance of the re-solidified material is difficult to observe, usually requiring comparison with a standard, and is basically permanent only for the time of inspection for customarily the record is lost by removal of the fusible material with a solvent.

It is an important object of this invention to provide a simple, rapid, and relatively inexpensive inspection, or testing, system which provides an easily read and permanent thermographic record of the results of the inspection. It is a special object of the invention to provide an inspection system which does not interfere with known inspection systems and is often complementary thereto. It is a particular object of the invention to provide a permanent, and removable, thermographic record of the nature of the brazed bond between a honeycomb and its thin skin made from high-strength metals and alloys possessing low heat conductivity. Other features and objectives of the invention will become apparent from the more detailed disclosure which follows.

In the practice of the invention, among other evaluations, the testing method and testing device has been used to inspect and evaluate the nature of the bond formed between the honeycomb and the skin of fabricated stainless steel honeycomb brazed sandwich structures and a like structure having a honeycomb core of titanium and a facing, or skin, of columbium. In the test pieces the skin varied up to 0.045 inch gauge and the core thickness varied up to one inch. The steels used were stainless 301 and 17–7 pH. The brazing alloys were nickel-boron and silver-lithium alloys. In each instance, the tests readily disclosed flaws such as delamination between facing and core, variations in fillet flow at nodes and core-facing interface and deformations in the core immediately adjacent to sheet facing. These test results are valuable in themselves and complementary to known testing techniques for delamination and non-uniform fillet flow cannot be readily detected by X-ray, particularly through surfaces of material having densities exceeding or equaling density of core material and brazing alloys, and both defects are nearly impossible to detect ultrasonically in a stainless steel honeycomb when the facing is very thin, i.e., 0.010 inch or less.

As an important aspect of the invention, a sensitive fluid has been developed which can be converted into a permanent pattern showing the presence, or absence, of flaws such as those disclosed above. Essentially the sensitive fluid contains a color-imparting ingredient, a transparent, or at least translucent, normally solid binder for the color to fix the pattern once it is developed, and a volatile liquid which will effectively disperse the color and binder while imparting sufficient fluidity to apply the sensitive fluid as a thin coating. From a practical point of view, the binder preferably used is an elastomeric polymeric substance such as conventionally used in protective coating media and the liquid used is a volatile solvent of the type used in the protective coating industry as solvents and liquid extenders. The preferred colors are those capable of forming a strong contrast with colorless regions such as reds, greens, oranges, and blue and especially oil-soluble organic dyes.

It has been found that when such a sensitive fluid is applied as a thin film over fabricated articles, such as described above, and heat is applied temperature differentials will develop and changes in viscosity and surface tension occur in the fluid. These temperature differentials cause fluid and color to be repelled, or migrate, from warm areas and accummulate in cooler areas. In this way, a pattern is developed. Upon the conversion of the binder into a solid by the evaporation of the solvent these patterns are fixed and constitute a permanent record of the test. Depending upon whether the heat is applied from the face side or the core side, the patterns developed are the reverse of one another. Thus, in a sense, one can develop a positive or a negative thermographic pattern.

A theory is not necessary to an understanding of the invention but observation leads to the conclusion the core cell walls act as "heat sinks." Also, it is believed the differences in the thermal properties of the brazing alloys and the low heat conductivity metals plays a part in developing the pattern. As is known, brazing alloys normally have thermal properties differing from those of the materials being bonded to one another. Thus, when heat is applied to the sensitive fluid from the skin side, heat will flow to the areas of good bond thereby creating the pattern. Where a bond is lacking no pattern will appear for the concentrated heat is not conducted selectively by brazing material and core, thereby failing to create a temperature differential on the surface and where imperfect bonds and imperfect filleting occur, discernible differences in the pattern appear.

While it has been found the invention is used advantageously in testing the bond in a fabricated metal sandwich having a facing metal possessing poor heat conductivity, it will be apparent the principles of the invention can be applied to evaluating the bond between any material having poor heat conductivity and another material forming a bond therewith possessing substantially better heat conductivity. For instance, the invention cannot be applied advantageously in evaluating a bond formed with a facing material having good heat conductivity such a facing made of aluminum or copper. The invention can be used, however, in evaluating the bond between a sandwich material in which the facing is made of a metal, including alloys, having poor heat conductivity, a ceramic, a cermet, a refractory, glass, or like materials possessing poor heat conductivity characteristics and a core-bond having importantly better thermal conductivity. Characteristically a brazing material has better thermal conductivity than the material being bonded but the better hermal conductiviy may be imparted by the core material itself or by the brazing material or by both.

In a preferred practice of the invention, the patterns are developed in such a way that they can be removed from the fabricated article and preserved in a permanent and unimpaired state. It has been found it is practically impossible to apply the sensitive fluid directly to the facing in a sufficiently thin layer to permit the developing of a good pattern and thereafter remove the film containing the developed pattern therefrom without destroying the pattern. Thus in the practice of the invention it has been found highly desirable to apply an easily removable base coat to the skin, or facing, before applying the sensitive fluid. In this way, the developed pattern may be removed readily without destroying the pattern. This easily removed base coat should be lightly adherent only and need adhere to the base only sufficiently tenaciously to remain in place during use. Of course the intersurface adherence depends on the nature of the respective surfaces and in smooth metal skins conventional pressure sensitive adhesive tapes adhere to the metal surface sufficiently lightly to be easily removed while the tape has sufficient heat resistance to permit development of the pattern and the evaporation of the relatively violatile liquid from the sensitive layer without the base coat being melted, dissolved by solvent, or importantly deformed. For instance, it has been found that a sensitive layer containing flamingo red dye, a hydrogenated rosin-glycerol ester gum binder and conventional volatile solvents can develop a pattern in about 10 seconds at 180° F. without adversely affecting the base coat made from typical pressure-sensitive tapes of the polyester (Mylar) type, the typical cellulose acetate (Scotch Brand) type, or the polyvinyl (Permacel) type.

In a further important aspect of the invention, a top film layer, or protective coating, is applied to the developed pattern to protect the pattern and assist in its removal from the skin of the honeycomb sandwich or like panel. In preferred practices of the invention both the base and the protective coating should be clear plastic but at least one must be translucent in order not to impair the visibility of the pattern. Where the protective layer is to assist in the removal of the pattern from the facing, it is apparent the intersurface, or interfacial, adhesion between the patterned layer and both the top and the bottom layer must be greater than the intersurface adhsion between the base coating and the facing. No difficulty is experienced in this regard for adherence to the smooth metal facing is much more difficult to achieve than interfacial adhesion between the plastics themselves. Thus the same pressure-sensitive tape, if desired, can be used for both the base coat and the top, or protective, coat.

It will be apparent the invention is not limited to the use of pressure sensitive tapes although they offer certain practical advantages for many other translucent, or preferably transparent, base coats may be used which will have adequate heat stability. Satisfactory base coats have been obtained from polyvinyl alcohol, polyvinyl chloride, polyvinyl acetate and various polyester films as well as from the pressure sensitive tapes. Vinylchloride type films are relatively inexpensive, are easily applied, readily strippable, and have good flexibility and good heat stability. Other suitable resins forming strippable films having adequate heat stability are obtainable from polyethylene, polyisobutylene, polyether, polyvinylbutyral and polyvinylidene resins. When not using preformed pressure sensitive tapes, the base coat may be applied in a conventional liquid medium so as to leave a dried film of 0.5 to 1.0 mil. Heavier films are unnecessary and thinner films tend to tear.

Films such as those set out above could be used as a protective and lifting coat but pressure sensitive tapes are preferred for this purpose.

A number of heat sensitive film-forming fluids which are capable of developing permanent thermographic patterns have been formulated and utilized. In the formulation commercial volatile solvents and extenders are used. For example, the naphtha used is the typical hydrocarbon solvent having a boiling range between 155 and 260° F. Varsol naphtha is composed basically of aliphatic hydrocarbons. Mineral spirits, sometimes called painter's naphtha, is a petroleum hydrocarbon boiling between 200 and 300° F. The following examples are illustrative.

*Example I*

| | Weight percent |
|---|---|
| 20 grams ester of hydrogenated rosin (Poly-Pale Ester gum #10, M.P. 109° C., trademark of Hercules Powder Company) | 7.14 |
| 4 grams Flamingo red dye (oil soluble) | 1.43 |
| 100 milliliters naphtha (Varsol) | 26.82 |
| 80 milliliters mineral spirits | 22.57 |
| 80 milliliters trichlorethylene | 41.96 |
| 0.25 gram carnauba wax | 0.08 |
| | 100.00 |

*Example II*

| | |
|---|---|
| 10 grams glycerol ester of hydrogenated rosin (Poly-Pale Ester gum #10) | 8.93 |
| 45 milliliters trichlorethylene | 59.06 |
| 20 milliliters mineral spirits | 14.11 |
| 25 milliliters naphtha | 15.89 |
| 2 grams Flamingo red dye | 1.79 |
| 0.25 gram carnauba wax | 0.22 |
| | 100.00 |

*Example III*

| | |
|---|---|
| 20 grams of a pentaerythritol ester of rosin and modified rosin (Pentalyn 860, M.P. 180° C., trademark of Hercules Powder Company) | 8.66 |
| 100 milliliters naphtha | 32.56 |
| 5 grams Flamingo red dye | 2.17 |
| 150 milliliters mineral spirits | 51.39 |
| 15 milliliters trichlorethylene | 5.22 |
| | 100.00 |

*Example IV*

| | |
|---|---|
| 20 grams Pentalyn 860 | 6.22 |
| 320 milliliters naphtha | 74.84 |
| 5 grams Sudan red dye | 1.56 |
| 15 milliliters trichlorethylene | 3.75 |
| 55 milliliters mineral spirits | 13.53 |
| 0.25 gram carnauba wax | 0.10 |
| | 100.00 |

*Example V*

| | |
|---|---|
| 10 grams Pentalyn 860 | 7.97 |
| 100 milliliters naphtha | 59.89 |
| 3 grams Sudan III red dye | 2.39 |
| 25 milliliters mineral spirits | 15.74 |
| 20 milliliters benzene | 14.01 |
| | 100.00 |

Developer solutions exactly like Example V were formulated as above except that green, orange and blue dyes were substituted for the red dye. All of the above formulations provided permanent thermographs on stainless honeycomb sandwich skins.

Each component in the above formulations is considered to serve the following function:

(a) The polymeric ester gum serves as the setting or residual medium to outline and fix the pattern. It provides a tough permanent flexible coating.

(b) The naphtha serves as the solvent for the ester gum and also is a factor in the controlled rate of drying.

(c) The oil soluble dye gives color and definition to the otherwise clear ester gum. It is an aid in defining the areas of heat or resin flow.

(d) The mineral spirits regulates the drying cycle of the developer. It adds an important quality of viscosity change when applying heat to the skin.

(e) The trichlorethylene is used primarily as a solvent for the dye but it can also be used to control drying time.

(f) The carnauba wax is used to dull the thermographic pattern; that is to "knock" the gloss. It is not an essential constituent.

(g) The benzene is used to dissolve the dye and as a replacement for trichlorethylene.

It will be realized from the foregoing formulations that many variations may be made in the solvents used and in their relative proportions provided they supply the viscosity and evaporation ratios needed in the heating cycle. Those disclosed are economical and function satisfactorily. In practice, trial runs are made on the particular thermographic solutions and the heating cycles determined.

In the use of coatings of the formulations set out above over a base coat on skins having a thickness of 0.025 inch to develop the thermographic pattern surface temperatures of 180° F. were measured on a radiometer. Thinner skins require less heat and thicker skins require more heat to develop the pattern. Operating temperatures of 120° F. to 225° F. have been used and proven satisfactory.

As previously pointed out, the sensitive fluid is applied as a very thin film either directly to the facing or preferably over the base coat. Then the film is dried in any desired way as with radiant heat from a quartz lamp, by ultraviolet light, etc. Only a very thin film of the sensitive material is required to develop a distinctive pattern such as coating forming films of 0.05 to 0.10 mil. Once the pattern is fixed over a strippable base coat, it may be easily raised by firmly pressing a pressure sensitive tape over it and pulling on the tape in the direction away from the facing of the honeycomb sandwich. The "lifted" thermograph then will constitute a laminated flexible film including the strippable base coat, the fixed test pattern as an interlayer, and the pressure sensitive tape as a top protective layer. This laminated flexible film constitutes a permanent thermographic test pattern which may be passed on with the fabricated article as guidance for further testing, if necessary, and thereafter may be stored as a permanent record. Since, in the preferred embodiments of the invention the test pattern is removable, the practice of this invention in no way affects the use of the tested article or the practice of other forms of testing procedure.

It will be recognized that other normally solid polymeric natural and synthetic resins conventionally used in paints or other protective coating media may be used to fix the thermographic pattern developed in accordance with this invention such as glycerol esters of wood rosin, maleic-alkyd modified rosin esters, fumaric-rosin adducts, phenolic modified rosins, ethylene glycol esters of polymerized rosin and the like. Other translucent, or preferably transparent, polymeric binders may be used such as acrylics, certain other resins derived from α-olefins, cellulose acetate, etc. may be used but those first mentioned above are economically feasible and may be easily removed with inexpensive solvents when non-strippable coating is used.

As has been pointed out, in the development of the fixed thermographic pattern of this invention the sensitive fluid layer may be applied directly over the surface of the material or preferably over a base coat which directly coats the surface of the material being subjected to the testing procedure so that it will be understood the expression "covering the metal surface," or the like expressions, includes either type of application.

The accompanying diagrammatic drawing with proper legends will further facilitate an understanding of the invention.

Figure 1:
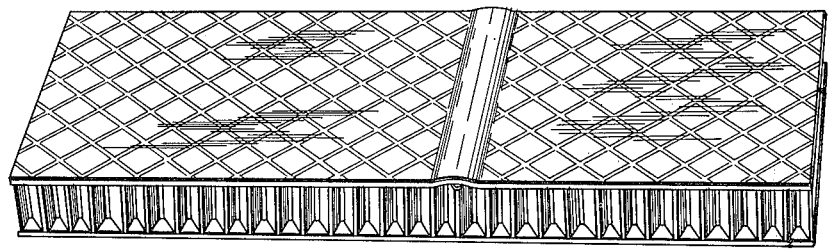
FIG. 1 shows a thermographic pattern developed in a film by the application of heat from the face side on a stainless steel sandwich having a 0.015 inch facing and a 0.0025 inch gauge (foil thickness) core wherein delamination, or deformations, have taken place adjacent the facing.
Figure 2:
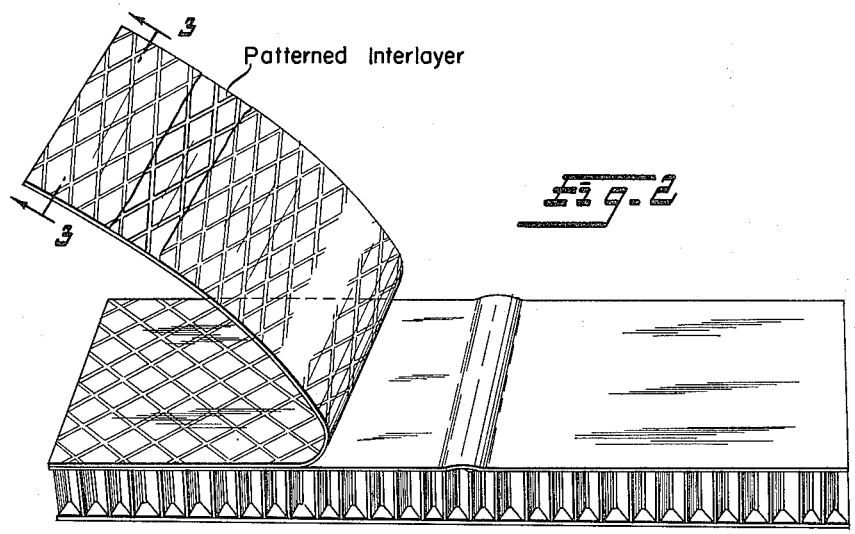
FIG. 2 shows the same sandwich from which a strippable pattern has been removed.
Figure 3:
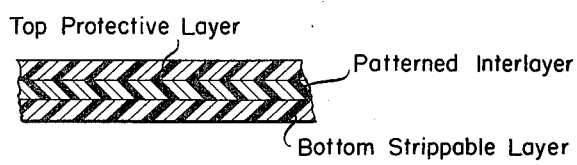
FIG. 3 shows an enlarged fragmentary section taken on line 3—3 of FIG. 2.

While certain details have been provided to illustrate the invention, it will be apparent these details may be varied and substitutions made in the illustrative formulations without departing from the sense of the invention or its scope as defined in the appended claims.

What is claimed is:

1. A method of determining the nature of a bond between a surface of a material having low heat conductivity and a second material having relatively substantially higher heat conductivity, which comprises covering said first surface with a fluid containing a color-imparting ingredient and a normally solid translucent flexible resinous binder dispersed in a volatile liquid and applying heat to said covering to induce migration of fluid and color at regions of good bond to thereby form regions of increased and decreased color while fixing said color in said regions by converting the fluid to a solid through the vaporization of the volatile liquid.

2. A method of determining the nature of a bond between a first metal of low heat conductivity and a second metal bonded thereto by a brazed bond of higher heat conductivity, which comprises covering a surface of said first metal opposite said bond with a fluid containing a color-imparting ingredient and a normally solid translucent flexible resinous binder dispersed in a volatile liquid and applying heat to said covering to induce migration of fluid and color at regions of good bond to thereby form regions of increased and decreased color while fixing said color in said regions by converting the fluid to a solid through the vaporizaiton of the volatile liquid.

3. A method of determining the nature of a bond between a first fabricated material of low heat conductivity and a second material bonded thereto through a bond possessing substantially higher heat conductivity, which comprises coating the surface of said first material opposite said bond with a weakly adherent translucent flexible resinous film, coating said film with a heat and color sensitive fluid containing a color-imparting ingredient and a normally solid translucent elastomeric polymeric binder dispersed in a volatile liquid and applying heat to the outer surface of said second coat to induce migration of fluid and color from regions of good bond to thereby form regions of increased and decreased color constituting a pattern while fixing said color in said regions by converting the fluid to a solid through the vaporization of the volatile liquid.

4. A method of determining the nature of a bond between a first metal and a second metal brazed thereto, which comprises coating the surface of said first metal opposite said bond with a weakly adherent transparent flexible resinous film, coating said film with a heat and color sensitive fluid containing a color-imparting ingredient and a normally solid transparent resinous binder dispersed in a volatile liquid, applying heat to the second coating to develop a pattern therein and to fix the pattern in a solid film by the vaporization of the volatile solvents, and applying a third transparent resinous film coating to the second film to protect the developed pattern.

5. The process of claim 4 in which the third film adheres to the second film and the second film adheres to the first film more tenaciously than the first film adheres to the metal and in which the films are lifted from the metal by pulling on the third film in a direction away from the metal surface.

6. A permanent thermographic test pattern comprising a flexible laminar sheet having transparent resinous flexible face lamina and a patterned flexible resinous interlayer sheet containing a color together with regions of different thickness outlining the pattern and a heat hardened normally solid transparent resinous binder fixing the pattern.

7. A permanent thermographic test pattern comprising a flexible laminar sheet having transparent pressure sensitive flexible resin facing lamina and an interlayer of a heat hardened normally solid colorless modified rosin flexible sheet containing an organic color together with regions of different thickness outlining a pattern therein.

References Cited by the Examiner
UNITED STATES PATENTS

| | | | |
|---|---|---|---|
| 2,667,070 | 1/54 | Sockman et al. | 73—104 |
| 3,002,385 | 10/61 | Wahl et al. | 73—358 X |
| 3,034,334 | 5/62 | De Forest | 73—15.4 |
| 3,059,474 | 10/62 | Keller et al. | 73—358 |

OTHER REFERENCES

Publication: Nondestructive Testing, March-April 1960, pages 114–118, article by Katzoff.

RICHARD C. QUEISSER, *Primary Examiner.*

DAVID SCHONBERG, *Examiner.*